US012632070B2

(12) United States Patent
Flauzino Chaves

(10) Patent No.: US 12,632,070 B2
(45) Date of Patent: May 19, 2026

(54) SYSTEM FOR CONTROLLING THE FLOW RATE OF A PLATFORM

(71) Applicant: PETRÓLEO BRASILEIRO S.A.—PETROBRAS, Rio de Janeiro (BR)

(72) Inventor: Jose Andersands Flauzino Chaves, Japaratuba (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 434 days.

(21) Appl. No.: 18/333,965

(22) Filed: Jun. 13, 2023

(65) Prior Publication Data

US 2024/0053773 A1 Feb. 15, 2024

(30) Foreign Application Priority Data

Jun. 14, 2022 (BR) ...................... 10 2022 011697 0

(51) Int. Cl.
*G05D 7/06* (2006.01)
*G05B 13/02* (2006.01)

(52) U.S. Cl.
CPC ....... *G05D 7/0623* (2013.01); *G05B 13/0285* (2013.01)

(58) Field of Classification Search
CPC ............... G05D 7/0623; G05D 7/0641; G05B 13/0285; E21B 44/00; E21B 2200/22; G06F 30/20
See application file for complete search history.

(56) References Cited

U.S. PATENT DOCUMENTS 6,260,004 B1 7/2001 Hays
6,757,579 B1 6/2004 Pasadyn
(Continued)

FOREIGN PATENT DOCUMENTS

WO WO 14/160464 10/2014

OTHER PUBLICATIONS

Chaves et al., Jul. 1, 2024, Modeling, simulation and control of shell and tube heat exchanger of Brazilian pre-sal FPSO, https://doi.org/10.22533/at.ed.26424180710, 18 pp.
(Continued)

*Primary Examiner* — Christopher W Carter
(74) *Attorney, Agent, or Firm* — Knobbe, Martens, Olson & Bear, LLP

(57) ABSTRACT

The present invention relates to a system for controlling the flow rate of a platform comprising at least one controller, wherein the at least one controller uses Fuzzy-PID logic; at least one processor, wherein the at least one processor includes at least one artificial neural network model; wherein the at least one artificial neural network model has at least two inputs, wherein the at least two inputs comprise choke valve opening percentage data of the at least one well and head pressure data upstream of the choke valve of the at least one well; and wherein the at least one artificial neural network model has an output, wherein the at least one output is the gas flow rate or the oil flow rate produced by the platform; wherein the controller feeds the at least one artificial neural network model with the choke valve opening percentage data of the at least one well and head pressure data upstream of the choke valve of the at least one well.

19 Claims, 14 Drawing Sheets

(56) References Cited

U.S. PATENT DOCUMENTS

| 9,008,807 | B2 | 4/2015 | Shapiro et al. | |
|---|---|---|---|---|
| 2007/0016389 | A1 | 1/2007 | Ozgen | |
| 2017/0293835 | A1* | 10/2017 | AlAjmi | E21B 49/00 |
| 2020/0065677 | A1* | 2/2020 | Iriarte Lopez | G06N 3/09 |
| 2022/0003071 | A1* | 1/2022 | Ahmari | E21B 47/10 |
| 2023/0235644 | A1* | 7/2023 | Martin | G06F 30/20 |
| | | | | 703/10 |
| 2024/0076953 | A1* | 3/2024 | Trifol | E21B 34/025 |
| 2024/0077860 | A1 | 3/2024 | Flauzino Chaves | |

OTHER PUBLICATIONS

Godoy, 2017, Plantwide control: a review and proposal of an augmented hierarchical plantwide control design technique, PhD Thesis, University of Sao Paolo, 219 pp.

Luyben, 2002, Plantwide Dynamic Simulators in Chemical Processing and Control. CRC Press (TOC).

Nunes et al., 2010, Modelagem e controle da produção de petróleo: aplicações em Matlab (Modeling and control in oil production: application in Matlab), Edgard Blucher Ltd. Ed. (TOC).

Lele, Dec. 12, 2019, Oil-well Flow-Rate Forecasting Using Auto-Regressive Model, Lele, Shreyas, Oil-well Flow-Rate Forecasting Using Auto-Regressive Model, https://ssrn.com/abstract=3502754, 5 pp.

Skogestad, 2004, Control structure design for complete chemical plants, Computers and Chemical Engineering, 28(1-2):219-234.

* cited by examiner

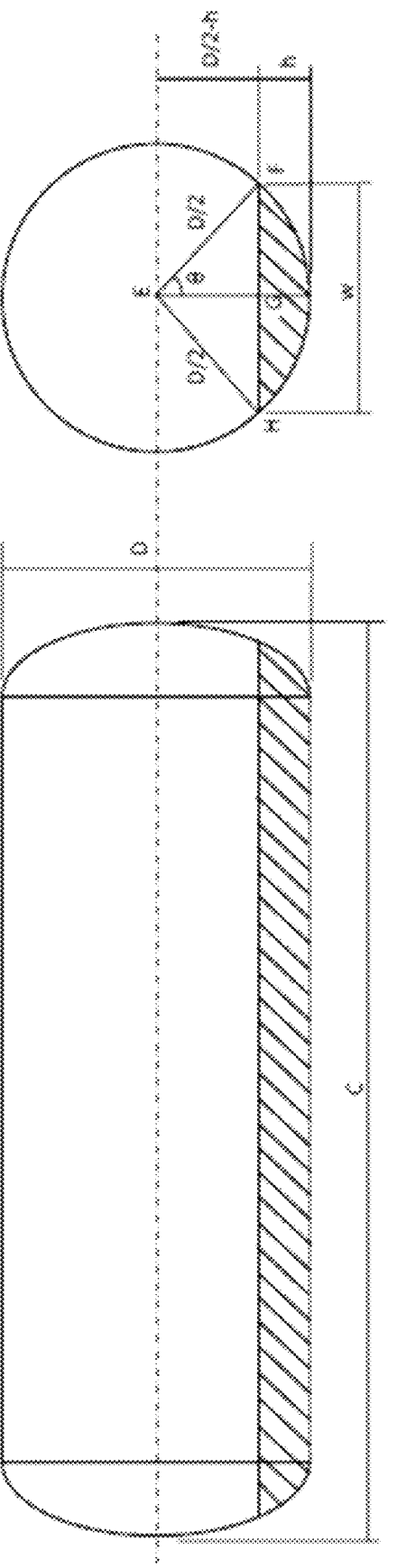
FIG. 2.1

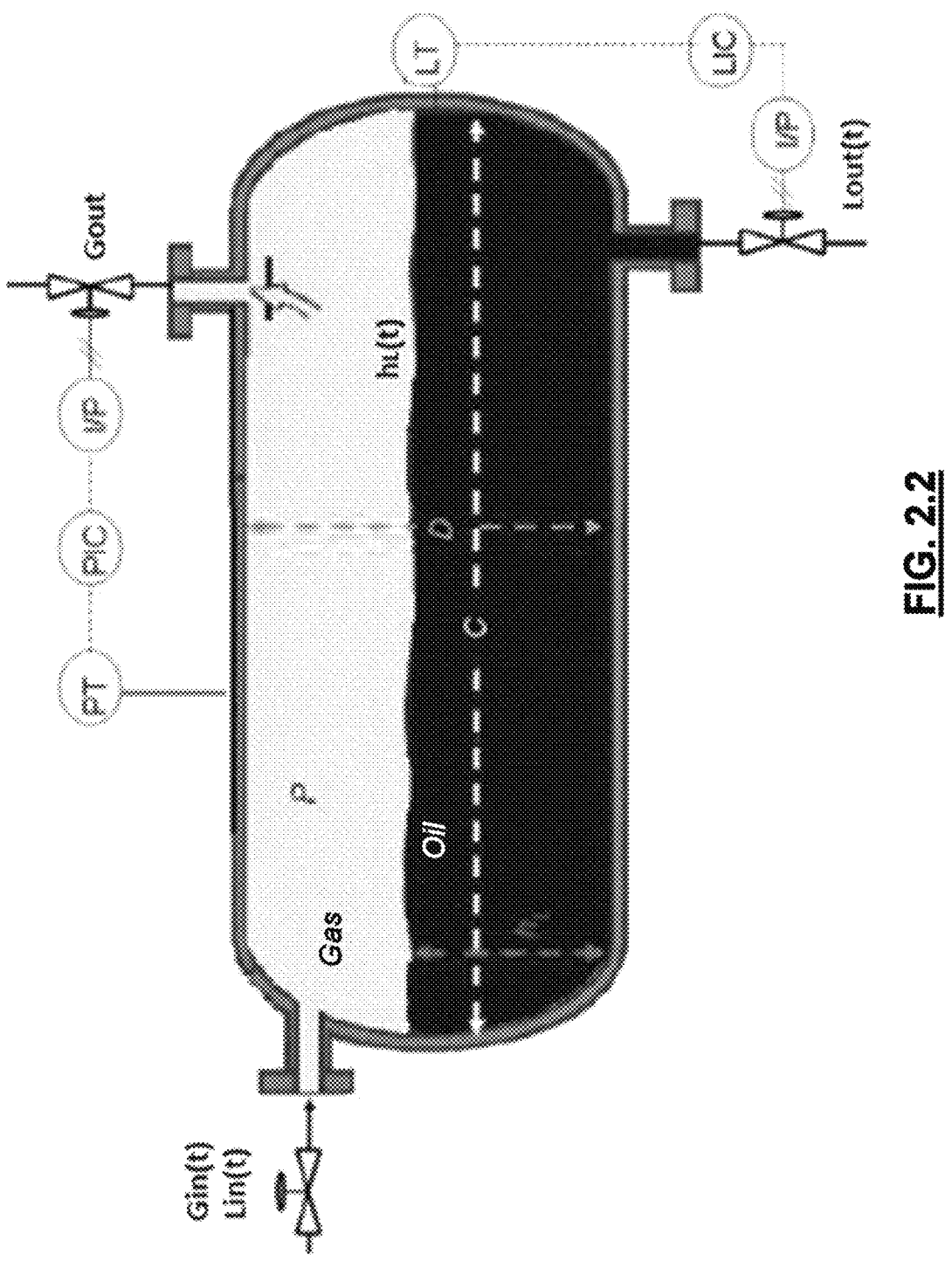
FIG. 2.2

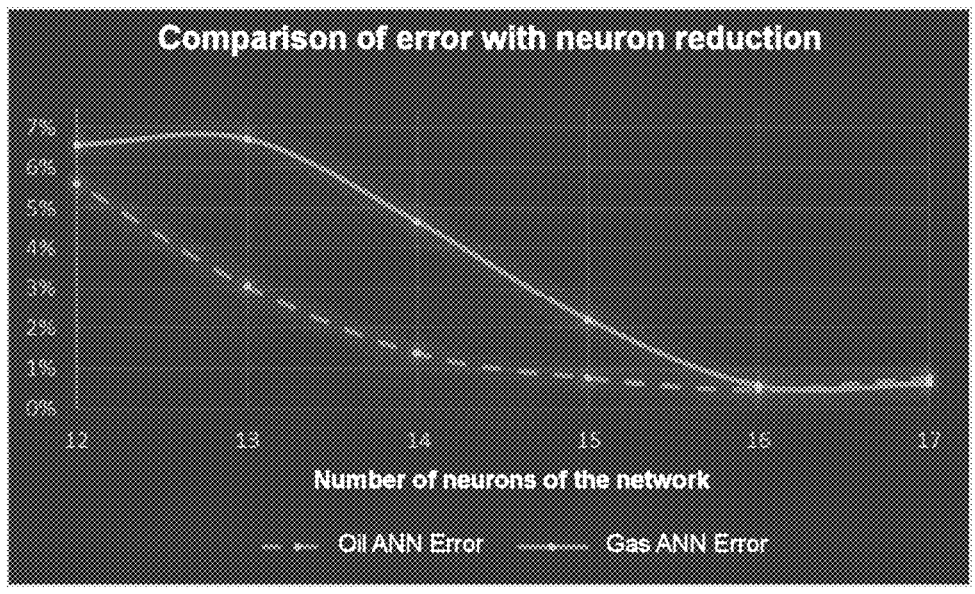
FIG. 4
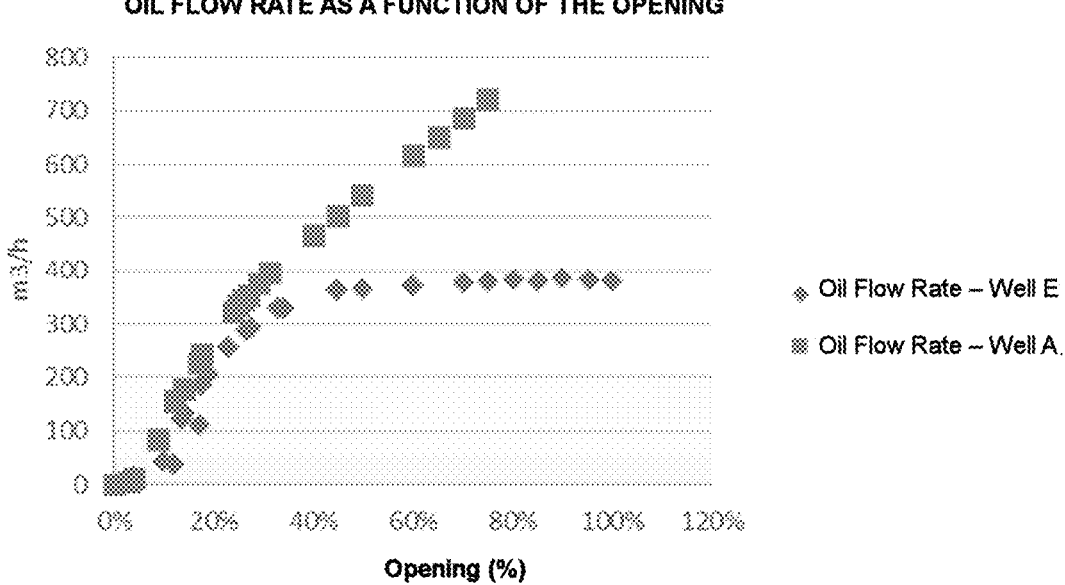
FIG. 5.1

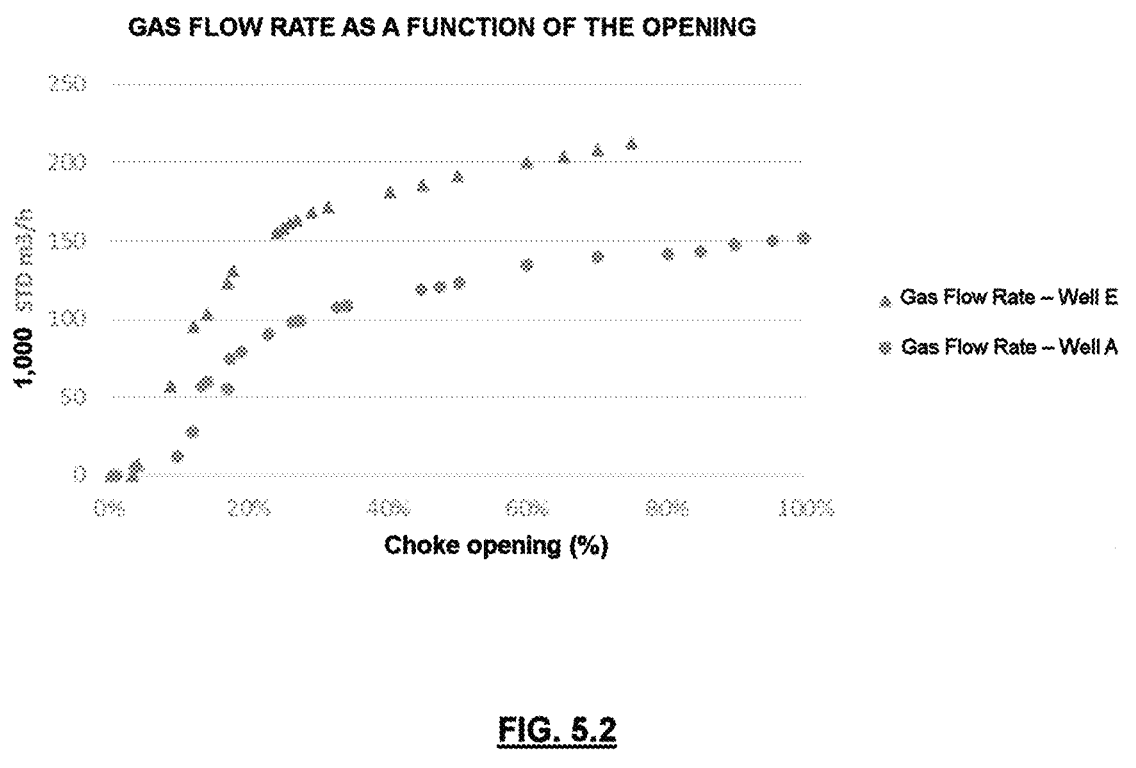

GAS FLOW RATE AS A FUNCTION OF THE OPENING

FIG. 5.2

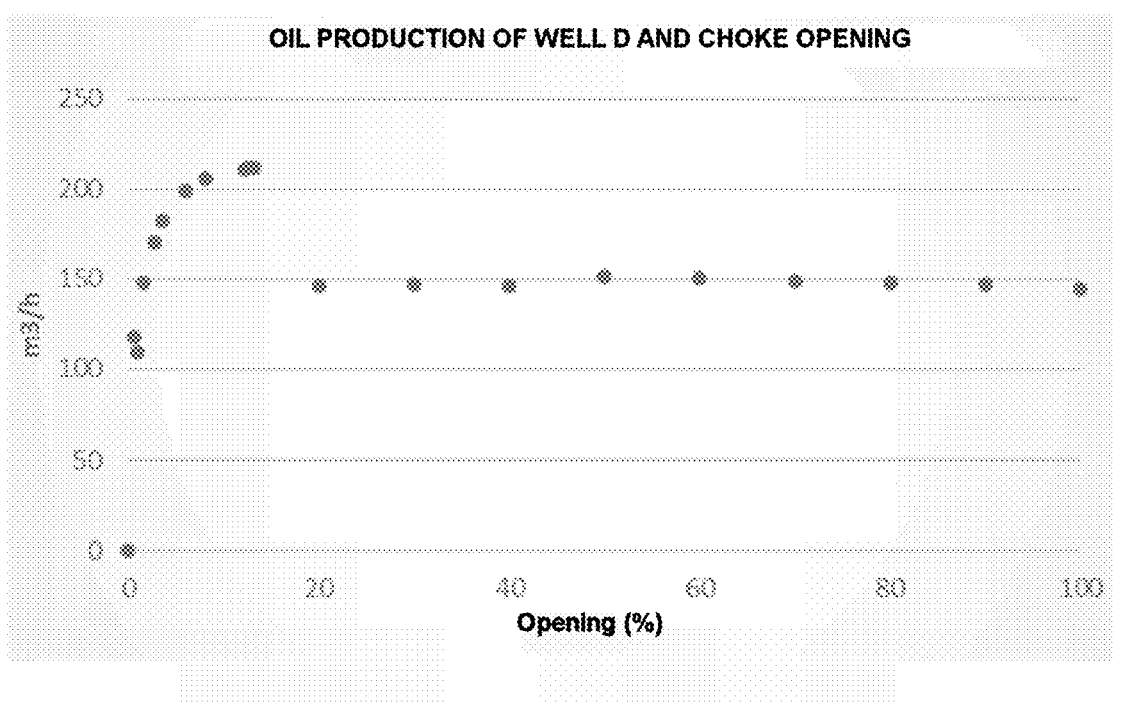
FIG. 6.1
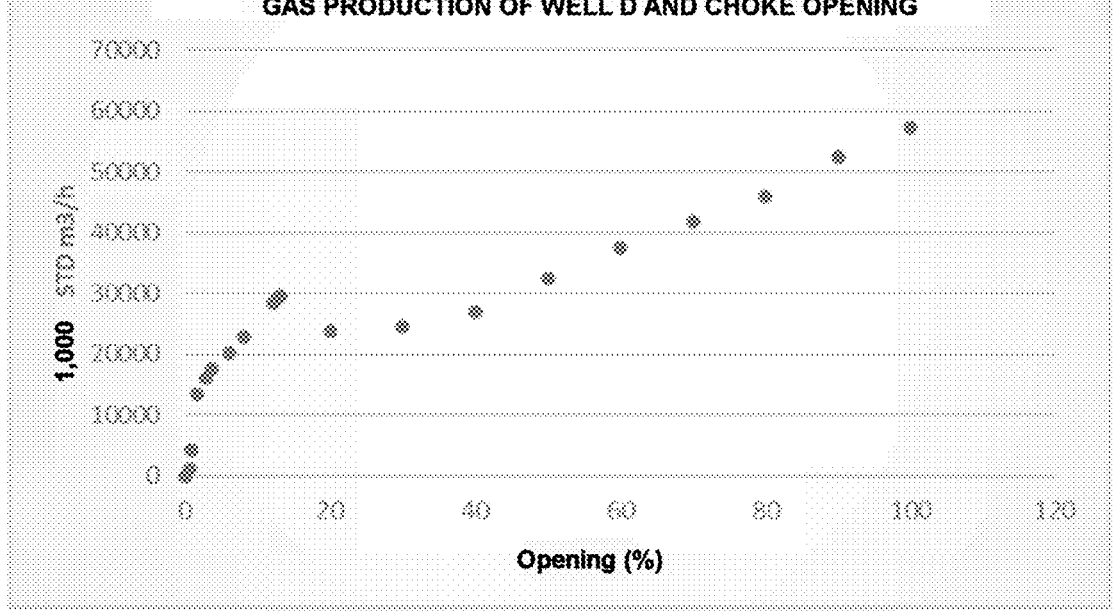
FIG. 6.2

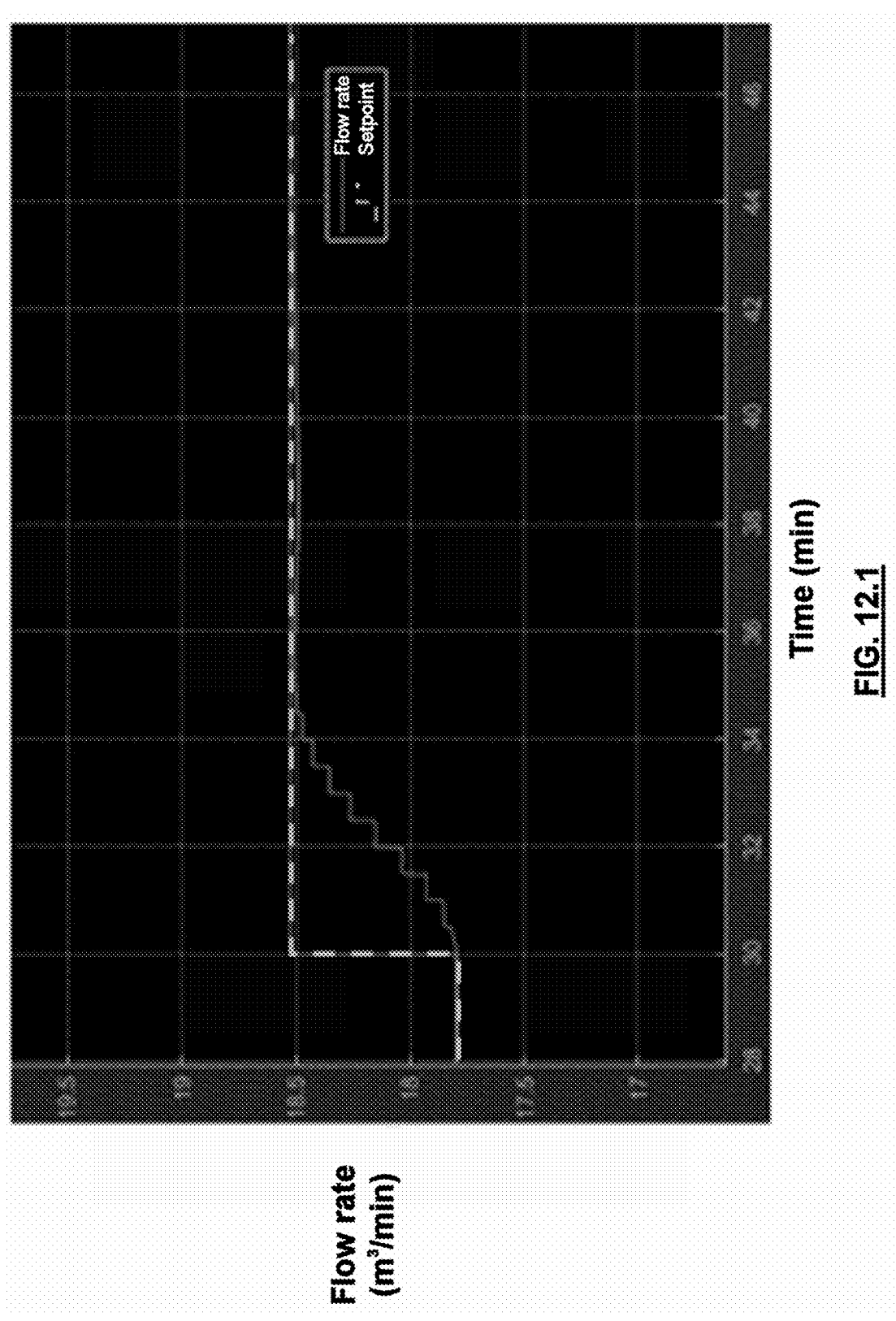
Flow rate (m³/min)
Time (min)
FIG. 12.1

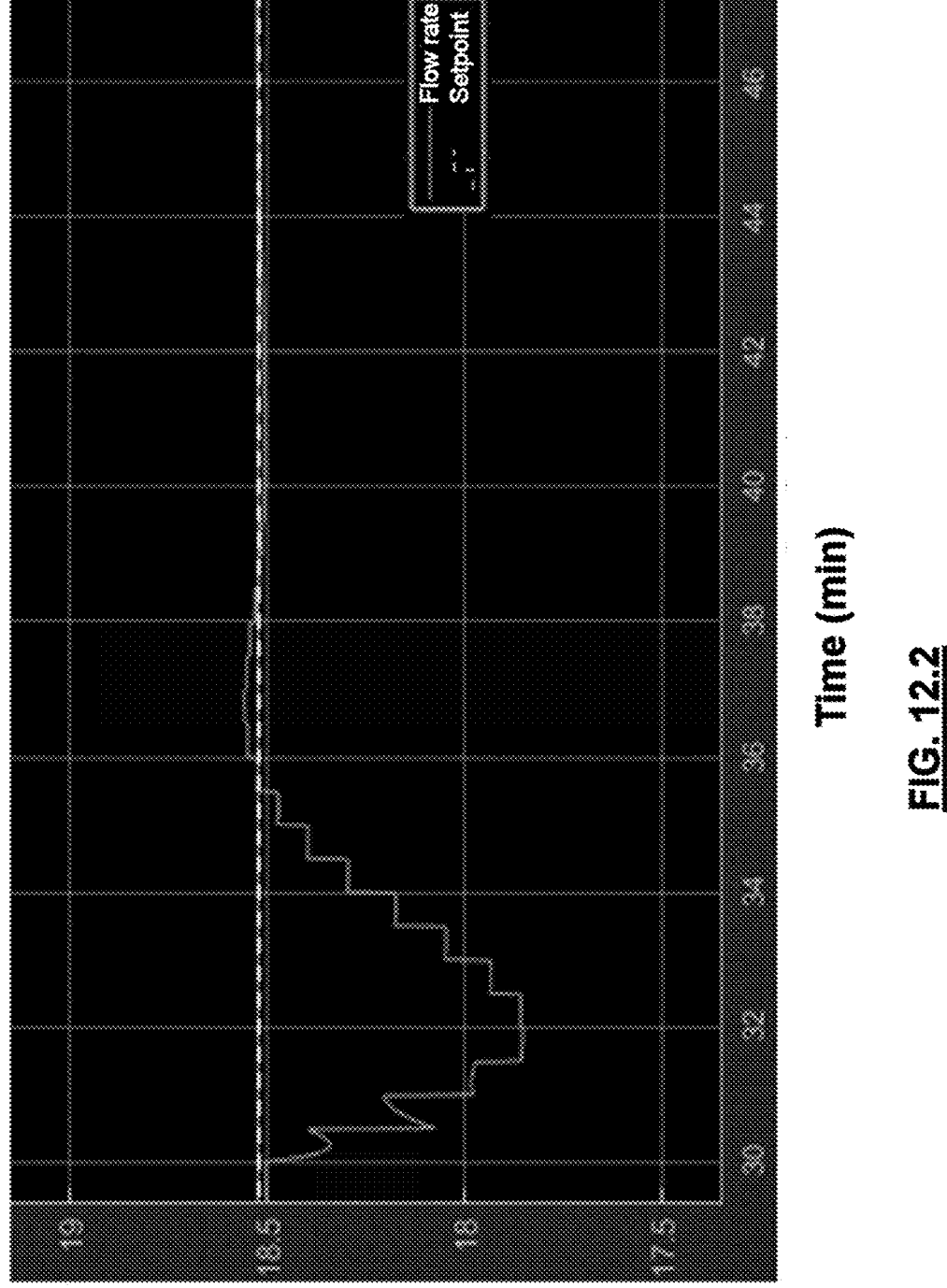
Flow rate (m³/min)
Time (min)
FIG. 12.2

SYSTEM FOR CONTROLLING THE FLOW RATE OF A PLATFORM

FIELD OF THE INVENTION

The present invention pertains to the technical field of oil production process control. More specifically, the present invention refers to a system for controlling the flow rate of a platform.

BACKGROUNDS OF THE INVENTION

In Brazil, offshore oil production is significantly higher, around at least 10 times more, than onshore oil production. In view of the high added value of oil and its essentiality for modern life, it is necessary that its production takes place in the most efficient way possible.

With the premise that the management of production from oil wells is the key to a good result of a concession, then it is necessary to evaluate modern forms of optimization to maximize its performance.

Subsea oil surge wells normally operate with manual actuation, by opening or closing the production choke valve of each well. Thus, activating the choke valve depends on the reaction time of the platform operator. In this way, any disturbance in the feeding process of the process plant is not automatically corrected, generating inefficiencies in production.

In addition, in some cases, the process plant operates below the nominal production level and in open-loop control, since the activation of the choke valve to increase the production of the wells depends on the visualization and performance of the platform operator for correction of deviations and variations, which happen at an inappropriate speed.

Deviations and variations in the plant production occur naturally and can interfere with the flow model and production of the wells, generating difficulties in predicting the plant flow rates as a function of the opening of the wells. In addition, deviations and variations in plant production can also cause a production below the nominal production.

Some examples of deviations and variations are the change in the slug profile of the wells (caused by formation of scales, hydrates, paraffin, change in gas production, etc.), reduction of pressure for flowing from the reservoir due to depletion or changes in operating conditions of the platform process equipment. The slug production system, resulting from the production of fluids by several risers, generates an oscillatory behavior that can bring instabilities to the process and difficulties for processing.

In addition, it is worth mentioning that the production tests are carried out in test gravitational separator vessels with dimensions and operating conditions different from the actual day-by-day production conditions that occur for the gravitational separator and with other oil wells, thus generating different liquid-vapor equilibrium conditions.

In view of the disclosure, it is observed that the control of the production that arrives for processing on a platform occurs manually, wherein the operator defines the volume to be produced for the process, from the opening of the choke valves of the wells, to reach a desired level and obtain a result based on the history of well tests and elevation/flow/reservoir studies.

Consequently, there is a need for a system to control the production of a plant by opening the wells, controlling the flow rate of oil processed on a platform and increasing its production, using closed loop flow rate control and providing automatic deviation correction.

STATE OF THE ART

In the state of the art, there are methods and systems designed to determine the behavior of wells, with respect to their productivity aspects, as noted below.

Document WO2014160464A2 describes a method to independently model a water flow rate, an oil flow rate and a gas flow rate using data-guided computer models. The method includes obtaining parameters from a well associated with an asset during a well test; creating the data-guided model set to model water flow, oil flow rate and gas flow rate based on the parameters; evaluating each model from the set of models; selecting a subset of models from the model set; modeling each water flow rate, oil flow rate, and gas flow rate independently using the subset of models; reconciling each water flow rate, oil flow rate and gas flow rate for the well with a total flow in the asset; and outputting the water flow rate, oil flow rate and gas flow rate.

In turn, document U.S.2007/0016389A1 is addressed to a method and system to accelerate and improve the history matching of a well and/or reservoir simulation model using a neural network. The neural network provides a correlation between the calculated historical matching error and a selected set of parameters that characterize the well and/or reservoir. The neural network iteratively varies a selection and/or the value of parameters to provide at least one set of history matching parameters with a value that provides a minimum for the calculated history matching error.

The article *Oil-well Flow-Rate Forecasting Using Auto-Regressive Model* by Shreyas Lele, 2020, addresses to the model for calculating the flow rate of wells, by applying a custom genetic optimization algorithm (GA), performing a correction to predict the flow rate of oil through the choke valves.

As can be seen from the description of the above-indicated documents of the state of the art, the documents are silent regarding a process control system for a platform using closed loop and neural networks, separating the production curves of the wells that produce for the platform based on surface data such as wellhead pressure data and surface choke valve opening data.

BRIEF DESCRIPTION OF THE INVENTION

In general terms, the present invention describes a system for controlling the flow rate of a platform comprising at least one controller, wherein the at least one controller uses Fuzzy-PID logic; at least one processor, wherein the at least one processor includes at least one artificial neural network model; wherein the at least one artificial neural network model has at least two inputs, wherein the at least two inputs comprise choke valve opening percentage data of the at least one well and head pressure data upstream of the choke valve of the at least one well; and wherein the at least one artificial neural network model has an output, wherein the at least one output is the gas flow rate or the oil flow rate produced by the platform; wherein the controller feeds the at least one artificial neural network model with the choke valve opening percentage data of the at least one well and head pressure data upstream of the choke valve of the at least one well.

As advantages of the system of the present invention, for example, it provides the closure of the control loop, ensuring that the platform production occurs continuously and at the nominal value defined in setpoint or other desired value, performing automatic corrections in the control valves in order to correct deviations that occur. The system of the present invention further comprises the use of neural networks for predicting the individual flow rate of the wells, based on the setting of the conditions of head pressure of the wells and opening of the choke valve of the wells (wells that are not the target of the analysis) with the variation of choke opening for the well under analysis, within the opening range that has already occurred in practice for the well under analysis, and considered in the neural network training data set.

BRIEF DESCRIPTION OF FIGURES

In order to complement the present description and obtain a better understanding of the features of the present invention, and according to a preferred embodiment thereof, in the annex, a set of figures is presented, where in an exemplified, although not limiting, manner, there is represented the preferred embodiment thereof.

FIGS. 2.1 and 2.2 illustrate the application of the variables of equations (1) to (5), showing how the relations are presented in the gravitational separator vessel GS.

FIG. 4 represents a graph of the relation between the error in the prediction of the test data set with the number of total neurons in the neural networks.

FIG. 5.1 indicates the relation between the oil flow rate from wells A and E as a function of the opening of their respective choke valves, according to an exemplary embodiment of the system of the present invention.

FIG. 5.2 shows the gas flow rate from wells A and E as a function of the opening of their respective choke valves, according to an exemplary embodiment of the system of the present invention.

FIG. 6.1 indicates the relation between the oil production of well D and the opening of its choke valve, according to a preferred embodiment of the system of the present invention.

FIG. 6.2 indicates the relation between the production of gas from well D and the opening of its choke valve, according to a preferred embodiment of the system of the present invention.

FIG. 12.1 displays a graph representing the response of the Fuzzy-PID controller of the system of the present invention to the variation in the setpoint by 4% for well E, indicating the flow rate in $m^3$/min for the time in minutes, according to an embodiment of the present invention.

FIG. 12.2 shows a graph that indicates the response of the Fuzzy-PID controller of the system of the present invention to the drop in productivity by 4% for well E, indicating the flow rate in $m^3$/min for the time in minutes, according to an embodiment of the present invention.

DETAILED DESCRIPTION OF THE INVENTION

Figure 1:
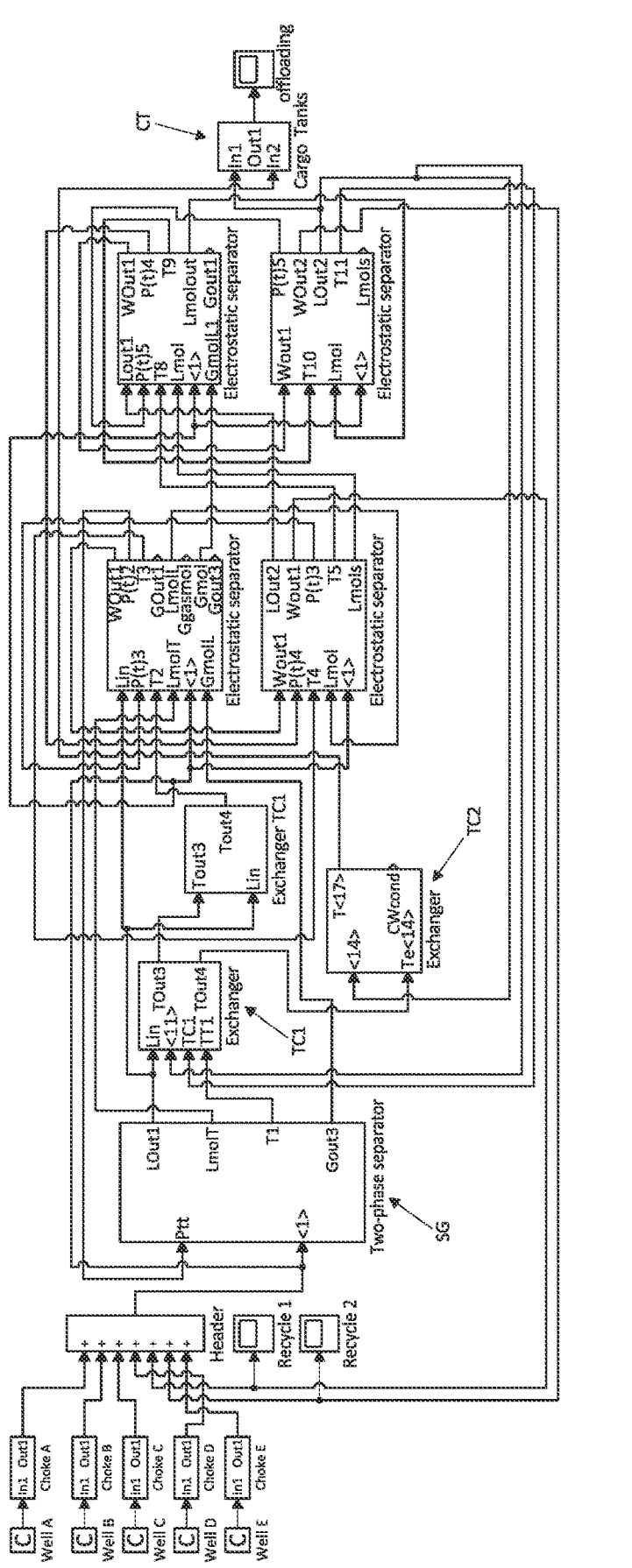
FIG. 1 shows an exemplary simulation of a process plant with features present in an FPSO-type platform.

The system for controlling the flow rate of a platform, according to a preferred embodiment of the present invention, is described in detail, based on the figures, which are attached.

Additionally, the system for controlling the flow rate of a platform of the present invention is described according to a preferred and exemplary embodiment thereof, applied to a platform, wherein the platform is an FPSO-type platform (Floating, Production, Storage and Offloading). However, the application of the system for controlling the flow rate of a platform of the present invention is not limited to the application in an FPSO type platform.

According to a preferred embodiment of the present invention, the system for controlling the flow rate of a platform comprises:

at least one controller 100, wherein the at least one controller 100 uses Fuzzy-PID logic;

at least one processor, wherein the at least one processor includes at least one artificial neural network model;

wherein the at least one artificial neural network model has at least two inputs, wherein the at least two inputs comprise choke valve opening percentage data of the at least one well and head pressure data upstream of the choke valve of the at least one well; and wherein the at least one artificial neural network model has an output, wherein the at least one output is the gas flow rate or the oil flow rate produced by the platform;

wherein the controller 100 feeds the at least one artificial neural network model with the choke valve opening percentage data of the at least one well and head pressure data upstream of the choke valve of the at least one well.

According to another preferred embodiment of the present invention, the controller 100 is installed at a point on the platform where there is the highest liquid flow rate.

According to an additional and preferred embodiment of the present invention, the controller 100 is installed at the outlet of at least one gravitational separator (GS) of the platform.

In accordance with another preferred embodiment of the present invention, the gravitational separator (GS) of the platform is modeled according to the equations:

$$\frac{dh_L(t)}{dt} = \frac{L_{in}(t) - L_{out}(t)}{2C\sqrt{[D - h_L(t)]h_L(t)}} \qquad (1)$$

$$\frac{dP(t)}{dt} = \frac{P(t)(G_{in}(t) - G_{out}(t) + L_{in}(t) - L_{out}(t))}{V - V_L(t)} \qquad (2)$$

5

-continued $$L_{out} = 2.4 \cdot 10^{-4} \cdot C_v f(x) \sqrt{\frac{\Delta P_v}{\rho_L / \rho_w}} \quad (3)$$

$$G_{out} = 2.4 \cdot 10^{-4} \cdot C_v f(x) \beta \varepsilon P(t) \sqrt{\frac{(P(t) - P_2)}{P(t) Z T \left(\frac{\rho_g}{\rho_{ar}}\right)}} \quad (4)$$

$$V_L(t) = \quad (5)$$

$$\frac{C_1 D_1^2}{4} \left[ \arccos\left[\frac{D_1 - 2h_L(t)}{D_1}\right] - \left[2 \frac{\sqrt{(D_1 - h_L(t)h_L(t))}}{D_1}\right]\left[\frac{D_1 - 2h_L(t)}{D_1}\right] \right]$$

wherein:

$V_L(t)$: Volume of liquid in the vessel (m³);

$V(t)$: Vessel volume (m³);

$\rho_L$: Liquid specific mass (kg/m³);

$\rho_G$: Gas specific mass (kg/m³);

$\rho_{air}$: Air specific mass (kg/m³);

$L_{in}(t)$: Inlet liquid volumetric flow rate in the vessel (m³/s);

$L_{out}(t)$: Outlet liquid volumetric flow rate in the vessel (m³/s);

$G_{in}(t)$: Inlet gas volume in the vessel (m³/s);

$G_{out}(t)$: Outlet gas volume in the vessel (m³/s);

$h_L/(t)$: Height of the liquid to the interphase (m);

$P(t)$: Vessel pressure (bar−1 bar=0.1 MPa);

C: Separator length (m);

D: Separator diameter (m);

ε: Isentropic expansion factor;

β: Aperture dependent (d/D);

K: Isentropic exponent;

Z: Compressibility factor.

According to a preferred embodiment of the present invention, the controller 100 is of the mamdani type.

In accordance with another preferred embodiment of the present invention, the controller 100 has two inputs and one output.

According to a preferred embodiment of the present invention, the at least one artificial neural network model is an artificial neural network model configured to determine the gas flow rate from at least one well as a function of the choke valve opening percentage; or an artificial neural network model configured to determine the oil flow rate from at least one well as a function of the choke valve opening percentage.

According to an additional and preferred embodiment of the present invention, the at least one artificial neural network model is trained from at least one set of historical data from at least one well and at least one set of historical data from at least a platform.

According to another preferred embodiment of the present invention, the at least one set of historical data from at least one well includes: choke valve opening percentage data of the at least one well and head pressure data upstream of the choke valve of the at least one well.

In accordance with another preferred embodiment of the present invention, the at least one set of historical data from at least one platform includes historical data of the oil flow rate or the gas flow rate produced by at least one platform.

According to a preferred embodiment of the present invention, the at least one artificial neural network model is trained from at least two inputs, wherein the at least two inputs comprise the choke valve opening percentage data of the at least one well and head pressure data upstream of the choke valve of the at least one well.

According to a preferred embodiment of the present invention, the artificial neural network model configured to determine the gas flow rate from at least one well as a function of the choke valve opening percentage is trained from at least one output, wherein the at least one output comprises historical gas flow rate data produced by at least one platform.

According to an additional and preferred embodiment of the present invention, the artificial neural network model configured to determine the oil flow rate from at least one well as a function of the choke valve opening percentage is trained from at least one output, where the at least one output comprises historical oil flow rate data produced by at least one platform.

According to a preferred embodiment of the present invention, the at least one artificial neural network model is designed as a feedforward network, using the backpropagation technique.

According to a preferred embodiment of the present invention, the synaptic weights and the bias of the at least one artificial neural network model are calculated with an arithmetic error of less than $10^{-4}$.

According to a preferred embodiment of the present invention, the at least one artificial neural network model comprises an input layer that is processed by a linear activation function.

According to another preferred embodiment of the present invention, the at least one artificial neural network model comprises an intermediate hidden layer that is processed by a sigmoid activation function.

According to another preferred embodiment of the present invention, the at least one artificial neural network model comprises an output layer that is processed by a linear activation function.

In FIG. 1, an exemplary simulation of a process plant with features present in an FPSO-type platform is presented, according to a preferred embodiment of the present invention. This exemplary simulation of the FPSO process plant is carried out in a modeling, simulation and analysis tool of dynamic systems, in order to allow the application of a preferred embodiment of the system to control the flow rate of a platform of the present invention and evaluate its gains. This simulated plan, as shown in FIG. 1, was elaborated and validated by the work of CHAVES, José Andersands Flauzino; DA SILVA, Flávio Vasconcelos; FONSECA, Rodolpho Rodrigues. *Modelagem e simulação dinâmica do processo de tratamento de óleo em um FPSO* (Modeling and dynamic simulation of the oil treatment process in an FPSO). Paper presentation. III SEMINÁRIO DE PESQUISA EM ENGENHARIA QUÍMICA (III RESEARCH SEMINAR IN CHEMICAL ENGINEERING). Federal University of Sergipe. 2021.

According to FIG. 1, it is possible to observe that the process plant starts with wells A, B, C, D and E and ends at the cargo tanks CT (cargo tanks).

The current condition of the FPSO platform under analysis is a process formed by five producing wells (well A, well B, well C, well D and well E); a three-phase separator that operates as a two-phase separator GS due to the insignificant production of water by the wells; four treatment vessels (2 degassers and 2 electrostatic separators); two shell-and-tube heat exchangers TC TC1; a compact plate-type heat exchanger TC2; and a platform storage tank, that is, a cargo tank CT.

In addition to the aforementioned equipment, the platform plant comprises a compact plate heat exchanger, which heats the water for the oil desalination stage. However, the dilution step for oil desalination was not considered in this simulation, and said equipment was not included in the present simulation in FIG. 1.

In the simulation performed, the focus is applied to the interface between the wells and the process. In this case, the modeling of the production of the wells, which feed the gravitational separator vessel GS, must be based on the opening of the choke valve, which is represented by the Fuzzy-PID controller (PID, Proportional Integral Derivative); and the modeling of the gravitational separator vessel GS, as it is the equipment that receives the production of all the wells and has its output controlled by the Fuzzy-PID controller of the system for controlling the flow rate of a platform of the present invention.

Thus, there follow below equations (1) to (5), which are used for modeling the gravitational separator vessel GS, according to what is presented in the book by NUNES, Giovani Cavalcanti; DE MEDEIROS, José Luiz; ARAÚJO, Ofélia de Queiroz Fernandes. *Modelagem e controle da produção de petróleo: aplicações em Matlab.* Editora Blucher, 2010.

$$\frac{dh_L(t)}{dt} = \frac{L_{in}(t) - L_{out}(t)}{2C\sqrt{[D - h_L(t)]h_L(t)}} \tag{1}$$

$$\frac{dP(t)}{dt} = \frac{P(t)(G_{in}(t) - G_{out}(t) + L_{in}(t) - L_{out}(t))}{V - V_L(t)} \tag{2}$$

$$L_{out} = 2.4 \cdot 10^{-4} \cdot C_v f(x)\sqrt{\frac{\Delta P_v}{\rho_L/\rho_w}} \tag{3}$$

$$G_{out} = 2.4 \cdot 10^{-4} \cdot C_v f(x)\beta\varepsilon P(t)\sqrt{\frac{(P(t) - P_2)}{P(t)ZT\left(\frac{\rho_g}{\rho_{ar}}\right)}} \tag{4}$$

$$V_L(t) = \tag{5}$$

$$\frac{C_1 D_1^2}{4}\left[\arccos\left[\frac{D_1 - 2h_L(t)}{D_1}\right] - \left[2\frac{\sqrt{(D_1 - h_L(t)h_L(t))}}{D_1}\right]\left[\frac{D_1 - 2h_L(t)}{D_1}\right]\right]$$

wherein:

$V_L$(t): Volume of liquid in the vessel (m$^3$);

V(t): Vessel volume (m$^3$);

$\rho_L$: Liquid specific mass (kg/m$^3$);

$\rho_G$: Gas specific mass (kg/m$^3$);

$\rho_{air}$: Air specific mass (kg/m$^3$);

$L_{in}$(t): Inlet liquid volumetric flow rate in the vessel (m$^3$/s);

$L_{out}$(t): Outlet liquid volumetric flow rate in the vessel (m$^3$/s);

$G_{in}$(t): Inlet gas volume in the vessel (m$^3$/s);

$G_{out}$ (t): Outlet gas volume in the vessel (m$^3$/s);

$h_L$/(t): Height of the liquid to the interphase (m);

P(t): Vessel pressure (bar−1 bar=0.1 MPa);

C: Separator length (m);

D: Separator diameter (m);

ε: Isentropic expansion factor;

β: Aperture dependent (d/D);

K: Isentropic exponent;

Z: Compressibility factor.

FIGS. 2.1 and 2.2 illustrate the application of the variables of equations (1) to (5), showing how the relations are presented in the gravitational separator vessel GS. Further, according to FIGS. 2.1 and 2.2, PT is a pressure sensor/transmitter, PIC is a pressure controller, I/P is a current to pressure converter, LT is a liquid sensor/transmitter and LIC is a level controller.

Regarding the modeling of the equations referring to the input feed of the gravitational separator vessel GS, there is no defined model regarding how much the wells produce as a function of the opening of their respective choke valves, since the production of the wells varies according to with time, pressure and arrangement of the wells that produce at that moment. As the control of the choke valve opening is performed manually and there is no continuous individual measurement of production per well, a mechanism for gauging the potential of these wells is necessary. Therefore, the flow rate control system of a platform of the present invention uses artificial neural networks (ANN, hereinafter, neural networks).

With respect to closing the loop to control the production of the wells, in order to maintain the feeding of the platform treatment process continuously and to correct any disturbances, the system for controlling the flow rate of a platform of the present invention uses a Fuzzy-PID logic controller, hereinafter Fuzzy-PID controller.

In this sense, the behavior of oil flow rate and gas flow rate produced by the wells, depending on the opening of the choke valves, is the result of the application of neural networks, as detailed below. In the present case, the flow control dynamics produced by the wells is complex, since there is a variation according to the inlet and outlet of each well, as well as the interaction that occurs with the level and pressure control of the separator vessel GS. Therefore, the modeling of well production (oil flow rate and gas flow rate) as a function of choke valve opening is represented by the Fuzzy-PID controller.

The Fuzzy-PID controller, according to the present invention, closes the loop of the wells with the platform process and performs a relational control between the liquid output flow rate of the gravitational separator GS of the oil treatment process with the flow rate produced by the wells, depending on the opening of their respective choke valves.

Furthermore, the Fuzzy-PID controller is also responsible for reducing the error to zero between the setpoint and the measured value, regardless of the disturbance that occurs, without the need to re-tune.

More specifically, according to a preferred embodiment of the present invention, at least 2 (two) neural networks are used: a neural network for calculating the gas flow rate from the wells and a neural network for calculating the oil flow rate from the wells. The neural networks are trained from a set of production data collected from the platform production information system under various flow rate conditions of the plant as a whole.

With regard to the inputs of each of the neural networks, the data of percentages of opening of the choke valve of the wells and head pressures upstream of the choke valves of the wells were used. As for the outputs of each of the neural networks, the oil flow rate data or the gas flow rate data produced by the platform were used.

Furthermore, according to a preferred embodiment of the present invention, a feedforward network with a backpropagation-type algorithm is used, calculating the synaptic weights and the bias necessary for the learning of each of the neural networks with an arithmetic error of less than 10$^{-4}$.

It is worth to highlight that the neural networks were created in order to obtain the results with the least number of epochs possible and even without underfitting or overfitting in the presentation of the data. In the design of each of the neural networks, a Python language library was used, namely the PyBrain library, in the Spyder development environment.

In addition, the use of two neural networks with one output each instead of a neural network with two outputs is advantageous, as it reduces the number of hidden intermediate layers, moving the problem from the deep learning area to the universe of machine learning, which is a simpler environment to work with. Still in this sense, the greater the number of outputs proposed for a neural network, the greater its complexity in predicting the desired behavior, using the same set of synaptic weights.

Figure 3:
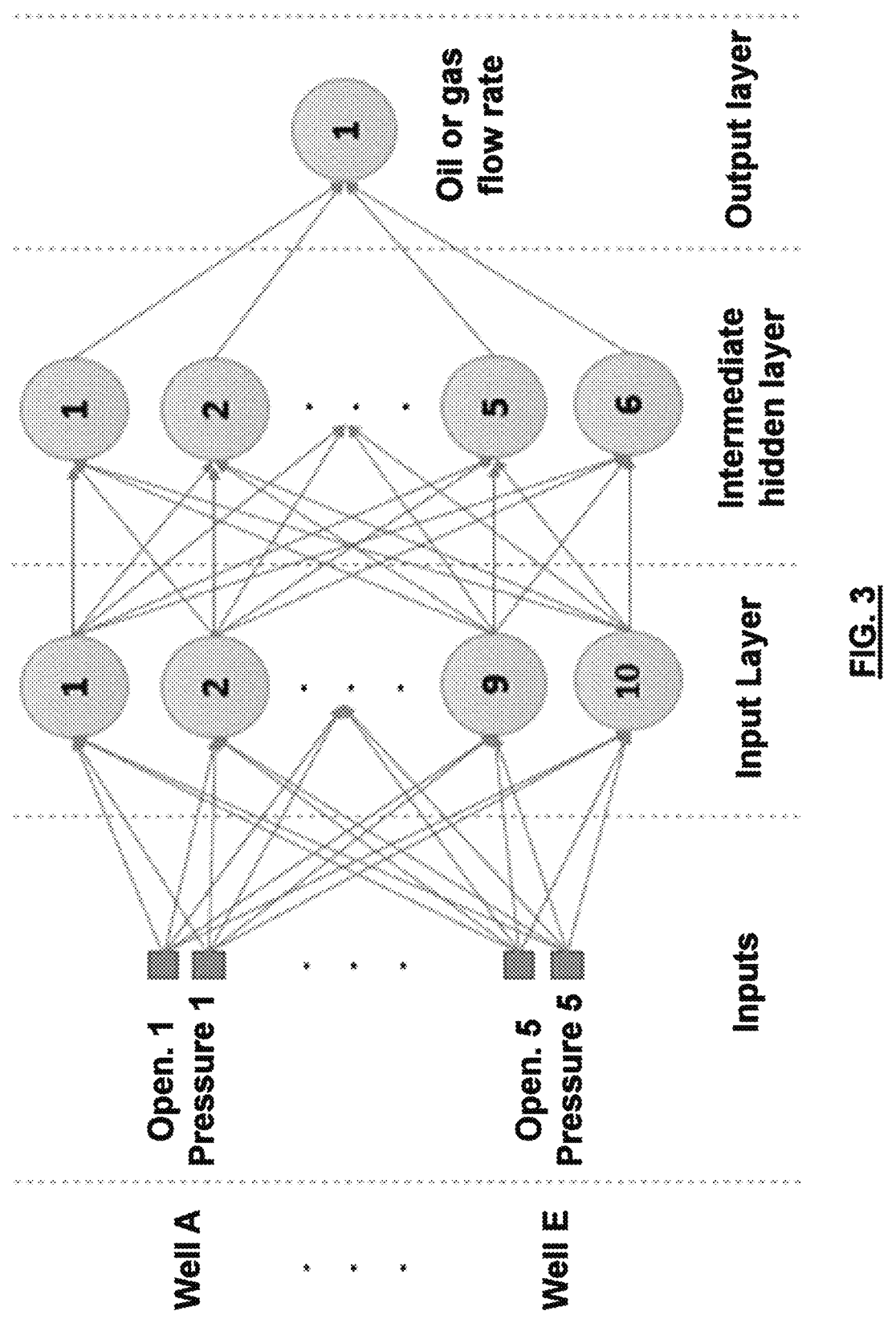
FIG. 3 presents a topology of a neural network, according to a preferred embodiment of the system of the present invention.

According to an exemplary embodiment of an embodiment of the present invention, as illustrated in FIG. 3, a topology of a neural network is presented, wherein such topology can be used for the two neural networks mentioned above, that is, for the neural network to calculate the gas flow rate from the wells and the neural network to calculate the oil flow rate from the wells.

In the exemplary application of the present invention, both neural networks are trained from a set of 1200 production data collected from the platform production information system.

Particularly, the neural network for calculating the gas flow rate from the wells has as inputs the choke valve opening data of wells A, B, C, D and E and the head pressures of wells A, B, C, D and E upstream of the choke valve. Accordingly, the neural network for calculating the gas flow rate from the wells has 10 inputs, including 5 pressure information Pressure 1 . . . Pressure 5 at the head of wells A, B, C, D and E upstream of the choke valve and 5 choke valve opening information Open. 1 . . . Open. 5 of wells A, B, C, D and E, that is, a pair of input information for each well A, B, C, D and E. Regarding the output of the neural network for calculating the gas flow rate from the wells, the gas flow rate produced by the platform is used.

Regarding the neural network for calculating the oil flow rate from the wells, the inputs are the choke valve opening of wells A, B, C, D and E and the head pressures of wells A, B, C, D and E upstream of the choke valve. Thus, the neural network for calculating the oil flow rate from the wells has 10 inputs, including 5 pressure information Pressure 1 . . . Pressure 5 at the head of wells A, B, C, D and E upstream of the choke valve and 5 choke valve opening information Open. 1 . . . Open. 5 of wells A, B, C, D and E, that is, a pair of input information for each well A, B, C, D and E. In turn, the output of the neural network for calculating the oil flow rate from the wells is the flow rate of oil produced by the platform.

Further referring to FIG. 3, each of the above-described neural networks has an input layer of 10 neurons, and these input layer neurons are processed by a linear activation function. In the intermediate hidden layer of each of the above-described neural networks, 6 neurons are indicated with their activation function of the sigmoid function type, providing greater non-linearity to the regression process with the synaptic weights in order to reduce the error more quickly. In the output layer, for each of the above-described neural networks, a neuron is used, using the linear activation function, recommended for regression problems.

The improvement in the accuracy of the calculation of the weights was achieved using a backpropagation algorithm.

Specifically, it is noted that activation functions of the ReLU (Rectified Linear Unit) family were not used, since the input and output data of each of the neural networks were normalized from 0 to 1, with 1 being the highest value found for the data class. Therefore, there are no negative entries.

Particularly, neural networks were designed by performing variations in learning rate and momentum rate. The optimal momentum rate and learning rate for the convergence of each of the neural networks were 0.6 and 0.4, respectively, providing satisfactory results for the number of epochs of the neural networks, namely: 760 epochs for the neural network to calculate the oil flow rate from the wells and 430 epochs for the neural network to calculate the gas flow rate from the wells, so that they reach the error criterion less than $10^{-4}$.

Furthermore, the error calculation is performed with a test database representing 25% of the training data set, which resulted in an error of 0.0077 for the neural network for calculating the oil flow rate from the wells and an error of 0.0063 for the neural network for calculating the gas flow rate from the wells, characterizing an advantage of the system of the present invention. In addition, it is noted that local maxima and minima were not found that would significantly alter the final error of each of the neural networks proposed with this architecture.

In particular, the convergence of the neural network for calculating the gas flow rate from the wells occurs faster than the convergence of the network for calculating the oil flow rate from the wells; this is due to the greater variability of the information from the gas in relation to the opening of the wells than that of oil, since the wells produce relative gas flow rates that are more different than those of oil, which are values closer to each other, which makes it difficult to separate the data.

Regarding FIG. 4, it presents a comparative graph of the relation between the error in the prediction of the test data set with the number of total neurons of the neural networks from the use of dropout, in order to guarantee that the networks neural networks do not have overfitting or underfitting.

Particularly, based on FIG. 4, it is possible to note that the topology of each of the neural networks, as illustrated in FIG. 3, may have a reduction of one neuron in the intermediate hidden layer (thus, totaling 5 neurons in the layer hidden intermediate and 16 total neurons in the network), as it presents a smaller error using the test data set with 16 total neurons in the network than the error obtained using 17 total neurons in the network, in this way, ensuring that there is no overfitting by increasing the error with the additional reduction of neurons in the intermediate hidden layer. Underfitting, on the other hand, does not occur, due to the low error achieved with each of the neural networks, even with more than 40 simulations carried out for evaluation, reaching an error average of 0.00489 for the neural network for calculating the oil flow rate and an error measure of 0.00538 for the neural network for calculating the gas flow rate in the new optimized configuration of each of the neural networks, that is, 10 neurons in the input layer, 5 neurons in the intermediate hidden layer and 1 neuron in the output layer, totaling 16 total neurons for each of the neural networks.

With the models of neural networks with an optimized configuration, described above, the results of the prediction of oil flow rate and gas flow rate obtained are analyzed.

It is important to note that neural networks, according to the present invention, are used to obtain as results the prediction of gas flow rate and oil flow rate per well, individually. These results are obtained based on fixing the wellhead pressure conditions upstream of the choke valve and the choke valve opening of all wells, wherein the choke valve opening variation for a specific well is within the range of opening of the choke valve that has already occurred in practice for the specific well under analysis, and such range is considered in the neural network training data set.

Therefore, the analysis of the results obtained by the neural networks is carried out, alternately, to have the oil flow rate and the gas flow rate of each well as a function of the opening of its choke valve.

FIGS. 5.1 and 5.2 show the graphs referring to the tests carried out with wells A and E. FIG. 5.1 indicates the relation between the oil flow rate of wells A and E as a function of the opening of their respective choke valves. FIG. 5.2 shows the gas flow rate from wells A and E as a function of the opening of their respective choke valves. According to the graphs in FIGS. 5.1 and 5.2, it can be seen that wells A and E obtained good results, as their choke valve opening data have a good analysis range, namely, from 0 to 80% for well A and from 0% to 100% for well E, thus expressing a good result for the given correlation, as well as when compared with the practical values.

FIGS. 6.1 and 6.2 illustrate two graphs that show an example of a test carried out with well D. FIG. 6.1 indicates the relation between oil production from well D and the opening of its choke valve. FIG. 6.2 indicates the relation between gas production from well D and the opening of its choke valve. Through FIGS. 6.1 and 6.2, it is possible to identify that well D has little data on the opening of the choke valve as a function of time, as it was only opened up to 13% of its potential. Therefore, the neural network output data are only coherent up to 13%, as seen in the graphs in FIGS. 6.1 and 6.2.

Therefore, with the data presented in FIGS. 5.1 and 5.2, it was possible to generate correlations between the opening of the choke valve and the production of wells A and E, in order to use the same in the system to control the flow rate of a platform, from according to the present invention.

Nevertheless, an analysis of local minima and maxima points of the neural networks is carried out, which could generate different interpretations of what was exposed above, for example. In this sense, 20 tests were performed with random initialization of the synaptic weights and bias, with different learning rates and moment rate. As a result, it was found that the variation between the final data was no more than 7% of the tests performed, thus validating that the information was not evaluated on points of local maxima and minima, but on the global optimal point.

As previously mentioned, the response of the variation in the flow rate of the wells depends on the operator, who manually activates the choke valve of the well to increase or decrease its flow rate. Thus, there are times when the plant operating flow rate is lower than the nominal flow rate, causing loss of production.

According to an embodiment of the present invention, the system for controlling the flow rate of a platform comprises the Fuzzy-PID controller. The Fuzzy-PID controller allows the nominal flow rate of the plant to be recovered more quickly and efficiently, in fractions of minutes, for example, regardless of the disturbance or change in the production strategy, or even due to the change of a value of desired flow rate, safely and minimizing losses.

In this sense, each point of a plant perceives a disturbance in the inlet flow rate and reacts in a different way and amplitude. Thus, the point where the Fuzzy-PID controller is installed, according to a preferred embodiment of the system of the present invention, is the point of the plant where there is greater sensitivity in relation to the liquid flow rate, because the greater the amplitude, the greater the uncontrollability.

According to the tests carried out in a system application to control the flow rate of a platform, 7 points were chosen for sensitivity analysis, in order to define where the controlled variable reading should be carried out to enable the control performed by the system of the present invention using Fuzzy-PID controller.

Figure 7:
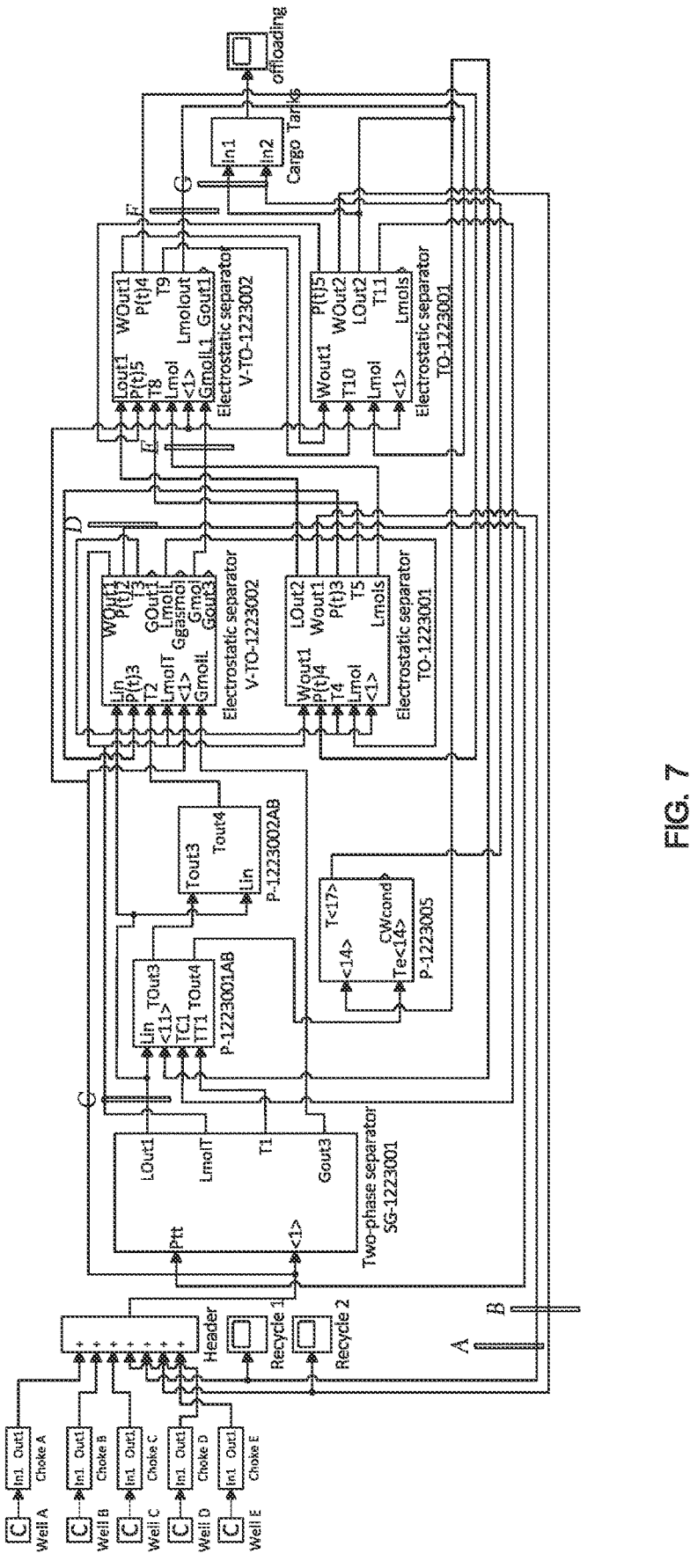
FIG. 7 presents the points A, B, C, D, E, F and G for sensitivity analysis for installing the Fuzzy-PID logic controller, according to a preferred embodiment of the system of the present invention.

FIG. 7 shows points A, B, C, D, E, F and G for sensitivity analysis for installing the Fuzzy-PID logic controller. In the tests carried out with the open-loop system, a disturbance in the feed stream of the plant is performed in the form of a positive step of 4%, and the results are reproduced in Table 1, below, which presents the sensitivity of the possible control points of flow rate with the Fuzzy-PID controller.

TABLE 1

| Sensitivity of possible points for flow rate control with the Fuzzy-PID controller | | |
|---|---|---|
| Location | Point | Sensitivity |
| Recycle 1 | A | 0.156 |
| Recycle 2 | B | 0.964 |
| Gravitational separator output (SG-1223001) | C | 0.965 |
| Electrostatic separator output (V-TO-1223001) | D | 0.929 |
| Electrostatic separator output (TO-1223001) | E | 0.918 |
| Electrostatic separator output (V-TO-1223002) | F | 0.846 |
| Electrostatic separator output (TO-1223002) | G | 0.866 |

Table 1 indicates that point C is the most sensitive point to the variation in liquid flow rate, where point C is the outlet of the gravitational separator. In this way, when controlling point C, through the system of the present invention comprising the Fuzzy-PID controller, the control of the other points of the plant is also achieved, since the other points have lower sensitivity than the sensitivity of point C.

The system for controlling the flow rate of a platform of the present invention involves passing through pressure, level and temperature loops, interacting with the entire process. For this reason, it is necessary to use the Fuzzy-PID controller.

Figure 8:
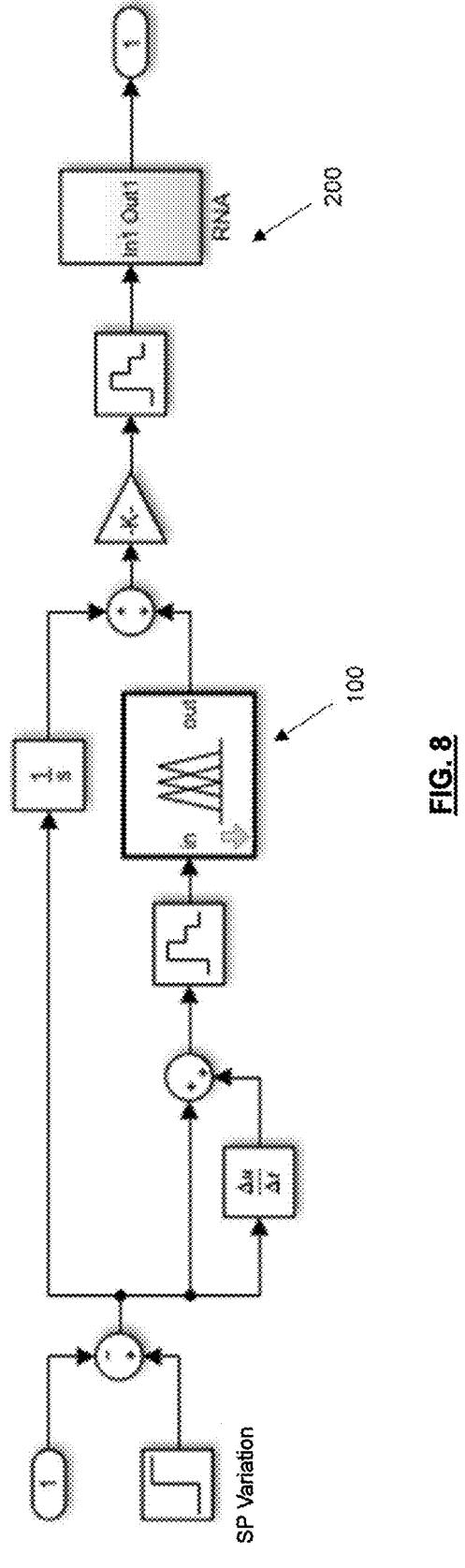
FIG. 8 illustrates the Fuzzy-PID controller according to a preferred embodiment of the system for controlling the flow rate of a platform of the present invention, with the application of neural networks.

FIG. 8 illustrates the Fuzzy-PID controller according to a preferred embodiment of the system for controlling the flow rate of a platform of the present invention, with the application of neural networks.

Specifically, according to the embodiment illustrated in FIG. 8, the controller has as its core a Fuzzy-PID controller 100 that represents the possible tuning of variation of the PID parameters, and thus feeds the functions elaborated in neural networks (ANN) 200 to provide the result of the plant operation flow rate, objective of the system of the present invention.

Figure 9:
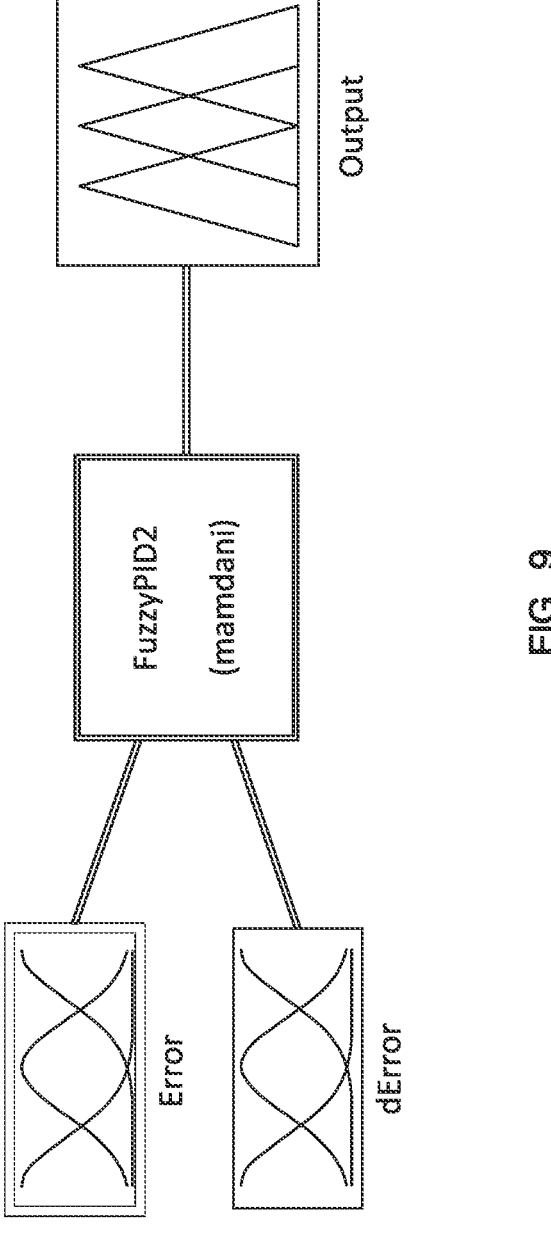
FIG. 9 presents a schematic of the Fuzzy-PID controller with mamdani configuration with two inputs and one output, according to a preferred embodiment of the system of the present invention.

More specifically, according to a preferred embodiment of the present invention, the Fuzzy-PID controller 100 presents the mamdani configuration with two inputs and one output, as identified in FIG. 9. Furthermore, the process of fuzzification and defuzzification of the Fuzzy-PID controller 100 is given by sigmoid functions.

In order to evaluate the performance of the Fuzzy-PID controller 100 that feeds the neural networks 200, according to a preferred embodiment of the system for controlling the flow rate of a platform, simulations were performed with variations in the control setpoint and disturbances in the variable manipulated, wherein in this case it is carried out from the inclusion of a well efficiency reduction term, simulating a hole in the well string or reduction of the pressure potential and elevation of the well.

Figure 10:
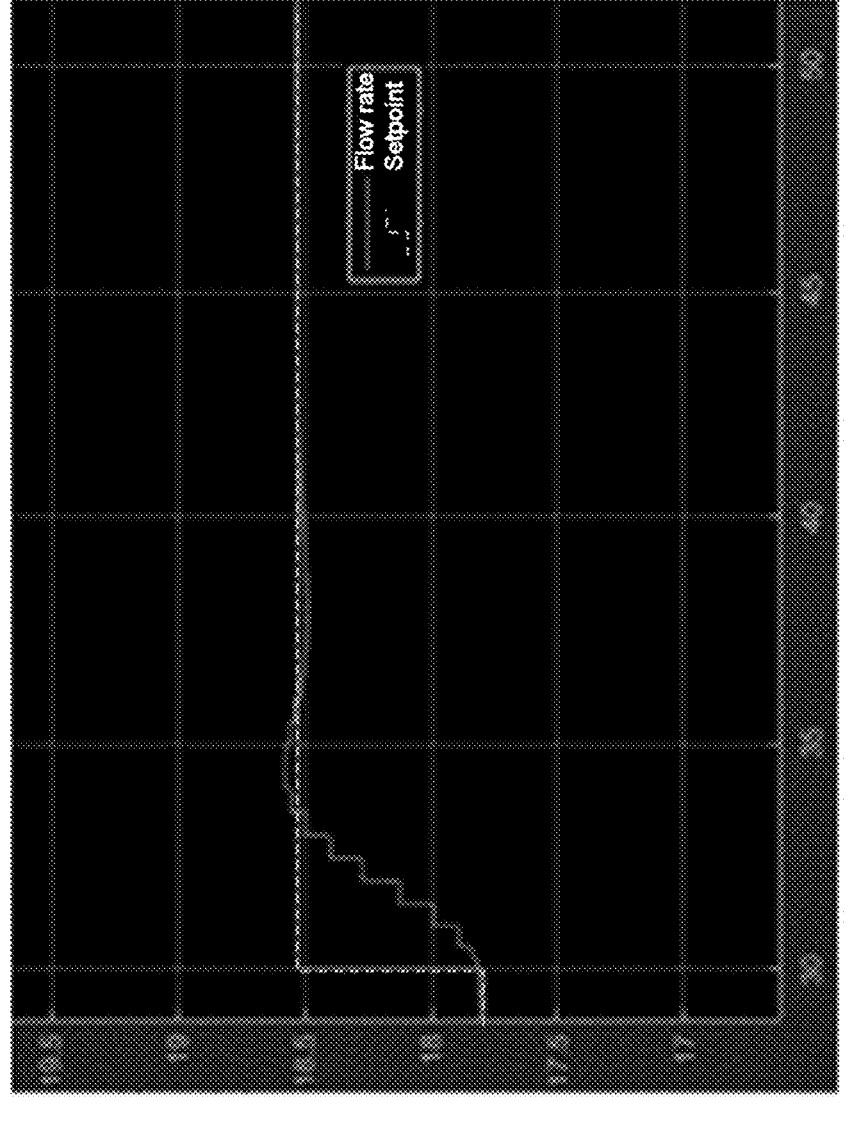
FIG. 10 presents a graph that relates the flow rate in $m^3$/min and the time in minutes, showing the response of the Fuzzy-PID controller applied with the neural networks of the system to control the flow rate of a platform, according to an embodiment of the present invention.

FIG. 10 presents a graph that relates the flow in m³/min and the time in minutes (min), showing the response of the Fuzzy-PID controller applied with the neural networks of the system to control the flow rate of a platform, from according to the present invention. The setpoint was varied by 4%. Specifically, in FIG. 10, it is possible to verify the response of the Fuzzy-PID controller to a 4% increase in the flow rate setpoint in the 30$^{th}$ minute of the simulation.

Figure 11:
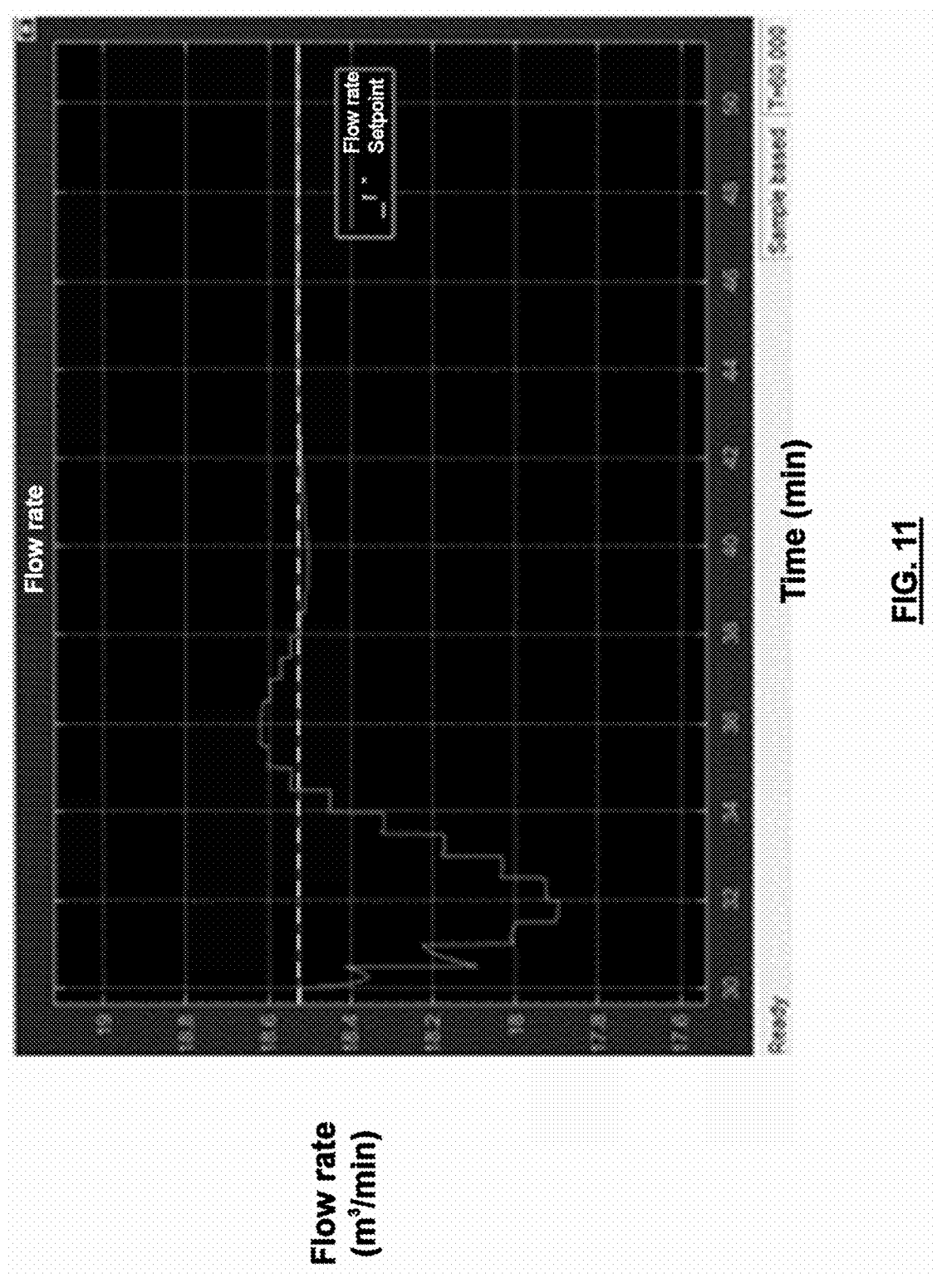
FIG. 11 represents a graph that illustrates the reduction in production, followed by the performance of the Fuzzy-PID of the present invention to make the process return to the flow rate setpoint, even with a 4% drop in well productivity, according to an embodiment of the present invention.

In addition, FIG. 11 presents a graph showing the reduction in production, followed by the activation of the Fuzzy-PID controller of the present invention to make the process return to the flow rate setpoint, even with a 4% drop in well productivity. The result shown in the graph in FIG. 11 indicates a gain, as what happens in practice is a delay between the operator's action time when there is a reduction in the efficiency of a well and the adjustment of the choke valve, which is performed manually by the operator.

With the system for controlling the flow rate of a platform comprising the Fuzzy-PID controller, according to the present invention, in less than 3 minutes, the well is already at a flow rate greater than or equal to the setpoint. In contrast, in manual practice, for small variations in production such as the one simulated in FIG. 11, that is, a 4% drop in production, there may be a delay of hours or even days for adjusting the well flow rate.

In addition, it is important to note that there is an empirical understanding that the reduction in well efficiency occurs due to natural decline and is therefore expected.

Additionally, it should be noted that the gravitational separator is fed in slugs, but for the Fuzzy-PID controller of the present invention to have a satisfactory response, a filter is used that removes the peak of the slug and makes the moving average of the gravitational separator input values in order to obtain a less noisy error value for the controller.

In order to provide a comparison with the simplified control performed by a conventional PID controller, tests were carried out and it was observed that the conventional PID control was sufficient for the servo mode, but was not able to control the regulatory mode in a satisfactory way, since, in the case under analysis, the variable that suffers the disturbance is the production function of the well itself. Thus, for the conventional PID controller to operate, a new tuning would be necessary, as the dynamics of the process is altered.

Below, in table 2, follows the comparison between the Fuzzy-PID control of the system of the present invention and the conventional PID control, through performance indicators, using well A to control the flow rate of the plant and measuring the outlet flow rate at the outlet of the gravitational separator.

TABLE 2

| Performance comparison of conventional PID control versus Fuzzy-PID control | | | | | | | | |
|---|---|---|---|---|---|---|---|---|
| OPEN LOOP RESPONSE ADJUST- MENT | TUNED BY | Mode | IAE | ISE | ITAE | ITSE | CE |
| Conventional PID by Sundaresan and Krishnaswamy | IMC τc = τ/10 | Servo | 3.74 | 1.12 | 22.38 | 8.92 | 0.038 |

TABLE 2-continued

| Performance comparison of conventional PID control versus Fuzzy-PID control | | | | | | | | |
|---|---|---|---|---|---|---|---|---|
| OPEN LOOP RESPONSE ADJUST- MENT | TUNED BY | Mode | IAE | ISE | ITAE | ITSE | CE |
| Fuzzy-PID well A | Sigmoid function | Servo | 1.68 | 0.717 | 12.88 | 4.26 | 0.018 |
| Fuzzy-PID well A | Sigmoid function | Regu- latory | 5.55 | 3.29 | 26.2 | 12.08 | 0.029 |

IAE—Integral Absolute Error
ISE—Integral Squared Error
ITAE—Integral Time-weighted Absolute Error
ITSE—Integral Time-weighted Squared Error
CE—Control Effort As indicated in table 2, the Fuzzy-PID controller, according to the system of the present invention, presents better performance than the conventional PID for a setpoint change of 4% in the production flow rate required by the process. In addition, the Fuzzy-PID controller of the system of the present invention also performs the control for the regulatory mode without the need for new tuning, while the conventional PID does not converge with the same tuning that was for the servo mode, when in the regulatory mode.

In addition, another advantage of the Fuzzy-PID controller compared to the conventional PID is the possibility of changing the well under control, for example, from well A to well E, and continue to carry out automatic control of the process without the need for a new tune. In contrast, conventional PID does not work without retuning.

FIG. 12.1 shows a graph that represents the response of the Fuzzy-PID controller of the system of the present invention to the variation in the setpoint by 4% for well E, indicating the flow rate in m³/min for the time in minutes (min).

FIG. 12.2 shows a graph that indicates the response of the Fuzzy-PID controller of the system of the present invention to the drop in productivity by 4% for well E, indicating the flow rate in m³/min for the time in minutes (min).

Specifically, FIGS. 12.1 and 12.2 show flow rate correction graphs in servo mode for well E, maintaining all the conditions imposed for the control simulation for well A shown above and the convergence to its setpoint.

Table 3, below, presents a comparison of the Fuzzy-PID control performance for the same conditions as the tests performed above, modifying only the well. In the simulations for well E, the actuator works harder, but not due to controller inefficiency. According to table 3, in regulatory mode, IAE and ISE are smaller and the rest of the indicators are very close to the respective ones in servo mode. This is due to the fact that well E has lower productivity, thus requiring a larger opening of the choke valve to obtain the same setpoint flow.

TABLE 3

| Fuzzy-PID control performance comparison, Well A versus Well E | | | | | | | |
|---|---|---|---|---|---|---|---|
| OPEN LOOP RESPONSE ADJUST- MENT | TUNED BY | Mode | IAE | ISE | ITAE | ITSE | CE |
| Fuzzy-PID well A | Sigmoid function | Servo | 1.68 | 0.717 | 12.88 | 4.26 | 0.018 |

TABLE 3-continued

| Fuzzy-PID control performance comparison, Well A versus Well E | | | | | | | |
|---|---|---|---|---|---|---|---|
| OPEN LOOP RESPONSE ADJUST- MENT | TUNED BY | Mode | IAE | ISE | ITAE | ITSE | CE |
| Fuzzy-PID well A | Sigmoid function | Regu- latory | 5.55 | 3.29 | 26.2 | 12.08 | 0.029 |
| Fuzzy-PID well E | Sigmoid function | Servo | 2.02 | 0.9138 | 15.94 | 5.62 | 0.039 |
| Fuzzy-PID well E | Sigmoid function | Regu- latory | 2.47 | 1.07 | 19.5 | 7.71 | 0.041 |

IAE—Integral Absolute Error
ISE—Integral Squared Error
ITAE—Integral Time-weighted Absolute Error
ITSE—Integral Time-weighted Squared Error
CE—Control Effort Regarding the assessment of the financial gain from the application of the system of the present invention for a specific FPSO platform evaluated, the Fuzzy-PID controller of the system of the present invention allows the plant to always work at the setpoint flow rate when in closed loop. In this way, a gain is generated related to the plant production compared to that produced during the time the plant does not operate in its nominal condition, while waiting for the operator's reaction time to increase the flow rate of the wells, manually, when some reduction in efficiency or disturbance in the process occurs.

In tests carried out, an average monthly gain of 25.6 m³ of oil was found between the operating time of the system of the present invention and the reaction time for manual actuation by the operator, when analyzing the production of the last 2 years of a platform, accounting for production valleys below the nominal production and that could be corrected by the system of the present invention.

With said data and adopting a theoretical oil price of US$ 87.51/bbl, a theoretical dollar price of R$ 5.46/US$, an internal rate of return or attractiveness of 10% p.a., an asset of 72 platforms under similar production conditions and which can undergo the same optimization, it is possible to calculate a gain of R$ 923,256.09 in financial return for 1 platform per year and up to R$ 277,189,464.08 in NPV (Net present value) for 72 platforms.

Those skilled in the art will value the knowledge presented herein and will be able to reproduce the invention in the presented embodiments and in other variants, encompassed by the scope of the attached claims.

The invention claimed is:

1. A system for controlling a flow rate of a platform, wherein the system comprises:
   at least one fuzzy logic PID (proportional, integral, derivative) controller comprising:
      a gas flow rate artificial neural network model having two inputs comprising:
         a choke valve opening percentage data of at least one well; and
         a head pressure data, wherein the head pressure data is measured upstream of a choke valve of the at least one well; and
      an oil flow rate artificial neural network model having two inputs comprising:
         the choke valve opening percentage data of the at least one well; and the head pressure data, wherein the head pressure data is measured upstream of the choke valve of the at least one well; and
   wherein the gas flow rate artificial neural network model has at least one output comprising a gas flow rate;
   wherein the oil flow rate artificial neural network model has at least one output comprising or an oil flow rate produced by the platform; and
   wherein the at least one fuzzy logic PID controller feeds the gas flow rate and oil flow rate artificial neural network models with the choke valve opening percentage data of the at least one well and the head pressure data upstream of the choke valve of the at least one well.

2. The system of claim 1, wherein the at least one fuzzy logic PID controller is installed at a point on the platform where a liquid flow rate is greatest.

3. The system of claim 1, wherein the at least one fuzzy logic PID controller is installed at an outlet of at least one gravitational separator (GS) of the platform.

4. The system of claim 1, wherein the at least one fuzzy logic PID controller comprises a mamdani type controller.

5. The system of claim 1, wherein the at least one fuzzy logic PID controller has two inputs and one output.

6. The system of claim 1, wherein the gas flow rate artificial neural network model is configured to determine the gas flow rate from the at least one well as a function of the choke valve opening percentage.

7. The system of claim 1, wherein the gas flow rate and oil flow rate artificial neural network models are trained from at least one set of historical data from the at least one well and at least one set of historical data from the at least one platform.

8. The system of claim 7, wherein the at least one set of historical data from the at least one well comprises:
   historical choke valve opening percentage data of the at least one well; and
   historical head pressure data upstream of the choke valve of the at least one well.

9. The system of claim 7, wherein the at least one set of historical data from the at least one platform comprises historical data of the oil flow rate or the gas flow rate produced by at least one platform.

10. The system of claim 1, wherein the gas flow rate and oil flow rate artificial neural network models are trained from the at least two inputs.

11. The system of claim 1, wherein the gas flow rate artificial neural network model is configured to determine the gas flow rate from the at least one well as a function of the choke valve opening percentage, and wherein the gas flow rate artificial neural network is trained from the at least one output, wherein the at least one output comprises historical gas flow rate data of the at least one platform.

12. The system of claim 1, wherein the oil flow rate artificial neural network model is configured to determine the oil flow rate from the at least one well as a function of the choke valve opening percentage, and wherein the oil flow rate artificial neural network is trained from the at least one output, wherein the at least one output comprises historical oil flow rate data of the at least one platform.

13. The system of claim 1, wherein the gas flow rate and oil flow rate artificial neural network models each comprises a feedforward network, with a backpropagation-type algorithm.

14. The system of claim 1, wherein a synaptic weights and a bias of the gas flow rate and oil flow rate artificial neural network models are calculated with an arithmetic error of less than $10^{-4}$.

15. The system of claim 1, wherein the gas flow rate and oil flow rate neural network models each further comprises an input layer that is processed by a linear activation function.

16. The system of claim 1, wherein the gas flow rate and oil flow rate artificial neural network models each further comprises an intermediate hidden layer that is processed by a sigmoid activation function.

17. The system of claim 1, wherein the gas flow rate and oil flow rate artificial neural network models each comprises an output layer that is processed by a linear activation function.

18. The system of claim 1, wherein the oil flow rate-artificial neural network model is configured to determine the oil flow rate from the at least one well as a function of the choke valve opening percentage.

19. The system of claim 1, wherein the oil flow rate artificial neural network model and the gas flow rate artificial neural network model are separate artificial neural networks.

\*     \*     \*     \*     \*